(12) United States Patent
Davydov et al.

(10) Patent No.: US 9,351,277 B2
(45) Date of Patent: May 24, 2016

(54) TIMING SYNCHRONIZATION FOR DOWNLINK (DL) TRANSMISSIONS IN COORDINATED MULTIPOINT (COMP) SYSTEMS

(75) Inventors: Alexei Davydov, Nizhny Novgorod (RU); Gregory Morozov, Nizhny Novgorod (RU); Alexander Maltsev, Nizhny Novgorod (RU); Vadim Sergeyev, Nizhny Novgorod (RU); Ilya Bolotin, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 13/997,232

(22) PCT Filed: Jun. 5, 2012

(86) PCT No.: PCT/US2012/040918
§ 371 (c)(1),
(2), (4) Date: Nov. 25, 2013

(87) PCT Pub. No.: WO2013/066412
PCT Pub. Date: May 10, 2013

(65) Prior Publication Data
US 2014/0086221 A1      Mar. 27, 2014

Related U.S. Application Data

(60) Provisional application No. 61/556,109, filed on Nov. 4, 2011.

(51) Int. Cl.
*H04W 68/02* (2009.01)
*H04W 72/04* (2009.01)
(Continued)

(52) U.S. Cl.
CPC ............ *H04W 68/02* (2013.01); *H04B 7/024* (2013.01); *H04B 7/0456* (2013.01); *H04J 3/12* (2013.01);
(Continued)

(58) Field of Classification Search
CPC ............ H04L 5/0078; H04L 2012/5674; H04L 2025/03745; H04L 27/2655; H04B 7/024; H04B 7/2662; H04W 56/00; H04W 56/0045; H04J 2011/0096
USPC ........................................ 370/336, 350, 503
See application file for complete search history.

(56) References Cited

U.S. PATENT DOCUMENTS

2010/0265874 A1\* 10/2010 Palanki et al. ............ 370/315
2011/0092231 A1   4/2011 Yoo et al.
(Continued)

FOREIGN PATENT DOCUMENTS

KR    10-2011-0083445 A    7/2011
WO   WO 2010/135712 A1   11/2010
(Continued)

OTHER PUBLICATIONS

International Search Report and Written Opinion received for PCT application No. PCT/US2012/040918, mailed on Jan. 21, 2013, 10 pages.
(Continued)

*Primary Examiner* — Warner Wong
(74) *Attorney, Agent, or Firm* — Thorpe North & Western LLP

(57) ABSTRACT

Technology for adjusting a receiver timing of a wireless device in a Coordinated MultiPoint (CoMP) system is disclosed. One method can include the wireless device receiving a plurality of node specific reference signals (RSs) from a plurality of cooperating nodes in a coordination set of the CoMP system. The coordination set includes at least two cooperating nodes. The wireless device can estimate a composite received RS timing from a plurality of received RS timings generated from the plurality of node specific RSs. The received RS timings represent timings from the at least two cooperating nodes. The wireless device can adjust the receiver timing based on the composite received RS timing. A node specific RS can include a channel-state information reference signal (CSI-RS).

22 Claims, 11 Drawing Sheets

(51) Int. Cl.
*H04B 7/02* (2006.01)
*H04B 7/04* (2006.01)
*H04W 4/06* (2009.01)
*H04W 24/02* (2009.01)
*H04W 4/00* (2009.01)
*H04W 72/08* (2009.01)
*H04W 52/24* (2009.01)
*H04J 3/12* (2006.01)
*H04L 5/00* (2006.01)
*H04L 5/14* (2006.01)
*H04W 52/14* (2009.01)
*H04L 1/00* (2006.01)
*H04L 27/26* (2006.01)
*H04W 76/00* (2009.01)
*H04W 76/02* (2009.01)
*H04W 52/34* (2009.01)
*H04W 84/14* (2009.01)

(52) U.S. Cl.
CPC ............ *H04L 1/0026* (2013.01); *H04L 1/0077* (2013.01); *H04L 5/0055* (2013.01); *H04L 5/0078* (2013.01); *H04L 5/14* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 72/042* (2013.01); *H04W 72/085* (2013.01); *H04W 76/002* (2013.01); *H04W 76/021* (2013.01); *H04W 52/244* (2013.01); *H04W 52/34* (2013.01); *H04W 84/14* (2013.01); *Y02B 60/50* (2013.01)

(56) References Cited

U.S. PATENT DOCUMENTS

2011/0183669 A1   7/2011  Kazmi
2011/0286376 A1*  11/2011 Yoo et al. ............... 370/312
2012/0257575 A1*  10/2012 Davydov et al. ......... 370/328
2013/0005327 A1*  1/2013  Flanagan ................. 455/422.1
2013/0083788 A1*  4/2013  Ghosh ..................... 370/347
2013/0156013 A1*  6/2013  Huang et al. ............. 370/336
2013/0178202 A1*  7/2013  Ho .......................... 455/422.1

FOREIGN PATENT DOCUMENTS

WO   WO 2011/047077 A2   4/2011
WO   WO 2011/063291 A2   5/2011
WO      2011/071291 A2   6/2011
WO      2011/075867 A1   6/2011
WO   WO 2013/051829 A1   4/2013
WO      2013/066412 A1   5/2013

OTHER PUBLICATIONS

International Preliminary Report on Patentability and Written Opinion received for PCT Patent Application No. PCT/US2012/040918, mailed on May 6, 2014, 6 pages.
Fujitsu, "Pseudo Transmission Timing Control Using Cyclic Shift for Downlink CoMP Joint Transmission", 3GPP TSG-RAN1 R1-091502, Feb. 2009, pp. 8, Meeting 56bis, Agenda 15.2, Seoul, Korea.
Huawei et al, "Discussion on Timing Advance Issue in CoMP", 3GPP TSG RAN WG1 R1-090130, Jan. 2009, pp. 9, Meeting 55bis, Agenda 12.3, Ljubljana, Slovenia.
LG Electronics Inc, "Support of Synchronization Between eNB-UE and RN-UE Link", TSG-RAN WG1 R1-100752, Jan. 2010, pp. 3, Meeting 59b, Agenda 7.5.1, Valencia, Spain.
Nokia et al, "Timing Alignment of DL Backhaul", 3GPP TSG RAN WG1 R1-093312, Aug. 2009, pp. 3, Meeting 58, Agenda 15.3 Study Item on LTE-Advanced, Relaying, Shenzhen, China.
Office Action for Japanese application 2014-539927 dated Jun. 30, 2015, 5 pages including English Translation.
Office Action for Korean application 10-2014-7013776 dated Jul. 20, 2015, 10 pages including English Translation.
Samsung, "Timing Advance for Uplink CoMP", 3GPP TSG-RAN WG1 R1-113099, Oct. 2011, pp. 6, Meeting 66bis, Agenda 7.5.4.5, Zhuhai, China.
Search Report for European application 12846319.7 dated Jul. 23, 2015, 11 pages.
Texas Instruments, "Timing Advance in Support of UL CoMP", 3GPP TSG RAN WG1 R1-113247, Oct. 2011, pp. 3, Meeting 66bis, Agenda 7.5.4.5, Zhuhai, China.

* cited by examiner

US 9,351,277 B2

TIMING SYNCHRONIZATION FOR DOWNLINK (DL) TRANSMISSIONS IN COORDINATED MULTIPOINT (COMP) SYSTEMS

RELATED APPLICATIONS

This application claims the benefit of and hereby incorporates by reference U.S. Provisional Patent Application Ser. No. 61/556,109 filed Nov. 4, 2011.

BACKGROUND

Wireless mobile communication technology uses various standards and protocols to transmit data between a node (e.g., transmission station) and a wireless device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the node station (or eNodeB) to the wireless device (or UE), and an uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pica-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
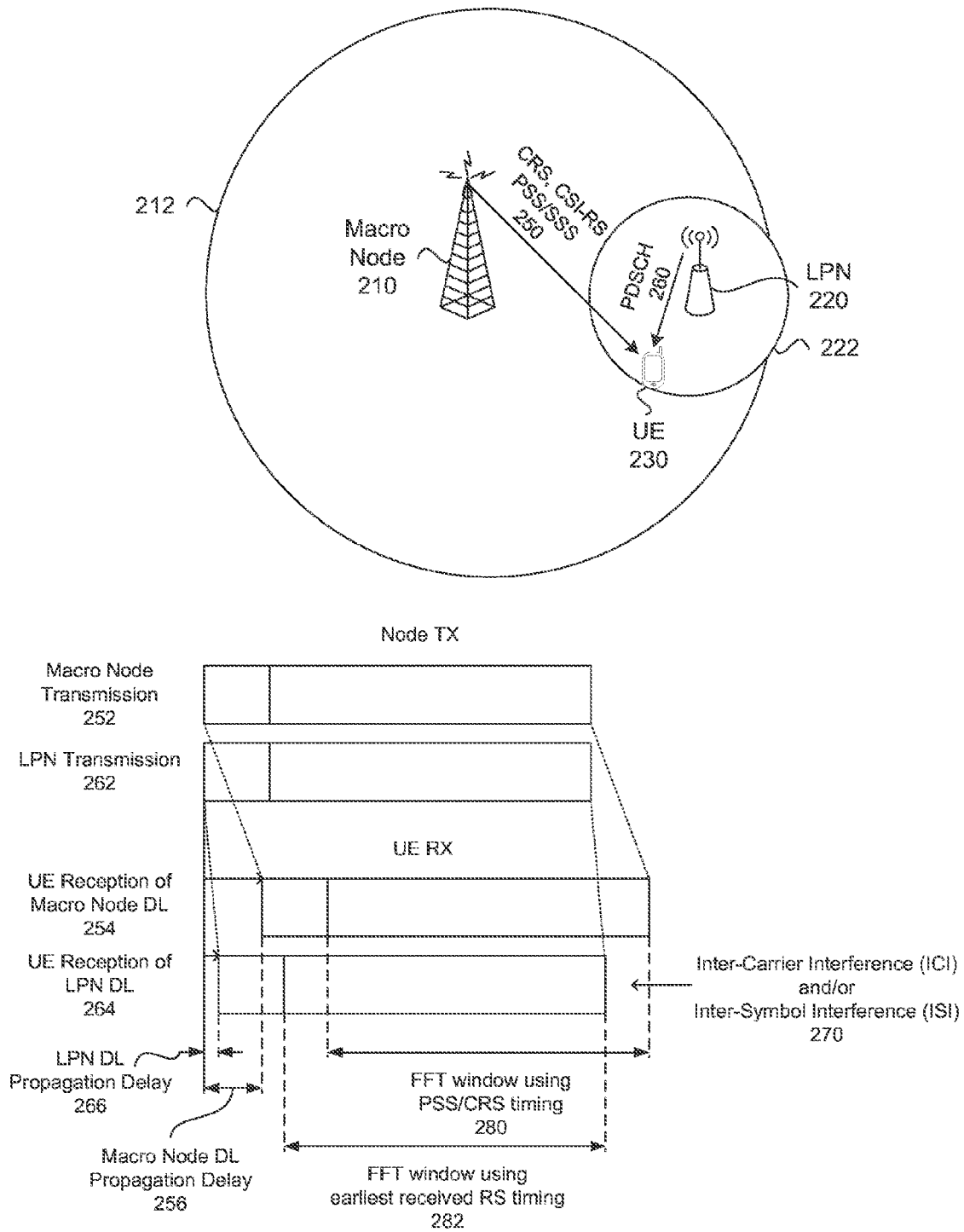
FIG. 1 illustrates a diagram of an orthogonal frequency-division multiplexing (OFDM) symbol transmission from a macro node and a low power node (LPN) in coordination set and a received OFDM symbol at a wireless device and adjusting a fast Fourier transform (FFT) window using an earnest received reference signal (RS) timing in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A Coordinated MultiPoint (CoMP) system may be used to reduce interference from neighboring nodes in both homogeneous networks and HetNets. In the Coordinated MultiPoint (CoMP) system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. Downlink CoMP transmission can be divided into two categories: coordinated scheduling or coordinated beamforming (CS/CB or CS/CBF), and joint processing or joint transmission (JP/JT). With CS/CB, a given subframe can be transmitted from one cell to a given wireless device (UE), and the scheduling, including coordinated beamforming, is dynamically coordinated between the cells in order to control and/or reduce the interference between different transmissions. For joint processing, joint transmission can be performed by multiple cells to a wireless device (UE), in which multiple nodes transmit at the same time using the same time and frequency radio resources and/or dynamic cell selection.

Figure 2:
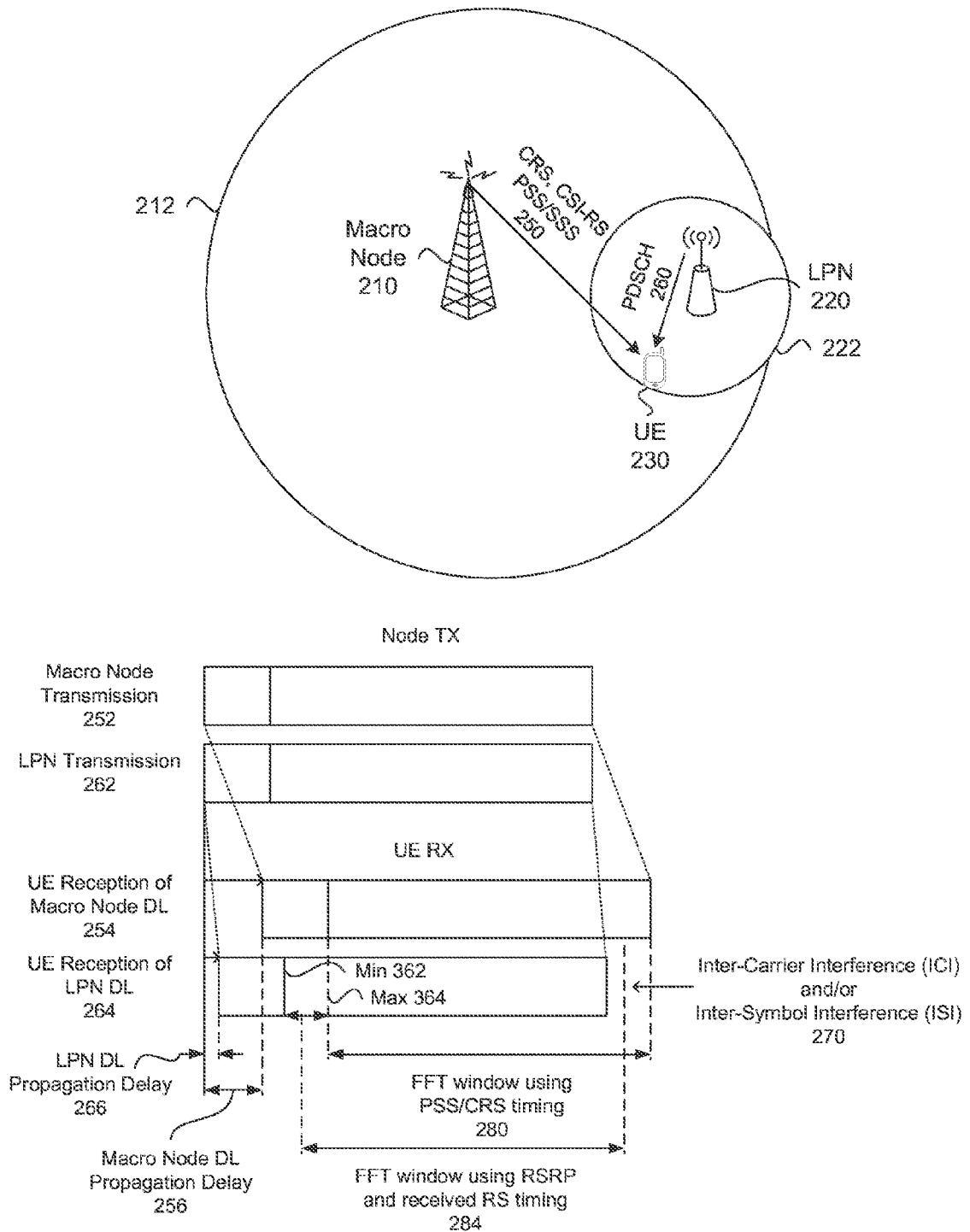
FIG. 2 illustrates a diagram of an orthogonal frequency-division multiplexing (OFDM) symbol transmission from a macro node and a low power node (LPN) in coordination set and a received OFDM symbol at a wireless device and adjusting a fast Fourier transform (FFT) window using reference signal received power (RSRP) and received reference signal (RS) timing in accordance with an example.

In non CoMP systems timing synchronization at the wireless device (e.g., the UE) can be carried out by using primary synchronization signals (PSS) and/or cell specific reference signals (CRS). In downlink (DL) CoMP systems and deployments with distributed antennas at different geographical locations, timing estimation using PSS and/or CRS may not be accurate since the PSS and/or CRS transmission point (e.g., a macro node 210 in a macro cell 212) may not be the same as a physical downlink shared channel (PDSCH) transmission point (e.g., a lower power node [LPN] 220 in a LPN cell 222), as illustrated in FIG. 1. In a dynamic point selection (DPS) DL CoMP example using a common cell identifier (ID) shown in FIG. 1, a DL transmission 250 (including a PSS and/or a CRS) from the macro node to the wireless device (e.g., a UE 230) and a separate DL transmission 260 (including data or a PDSCH) from the LPN to the wireless device can be transmitted at a substantially same time. The DL transmissions can arrive at the wireless device at different times due to different geographical locations of the nodes (e.g., the macro node and the LPN) and/or other factors. The wireless device can be synchronized to the PSS and/or CRS transmission point (e.g., the macro node). For example, an orthogonal frequency-division multiplexing (OFDM) symbol in a macro node transmission 252 and a substantially same OFDM symbol in a LPN transmission 262 can be received by the wireless device (e.g., UE) at different times due to propagation delays. The OFDM symbol can include a cyclic prefix (CP). A UE reception of the macro node DL transmission 254 can have a larger propagation delay 256 than a propagation delay 266 of a UE reception of the LPN DL transmission 264 due to the UE being closer to the LPN than the macro node. If the PSS and/or CRS from the macro node are used for timing synchronization, the timing of the fast Fourier transform (FFT) window 280 used to sample the OFDMA symbol can be synchronized to the macro node DL transmission, which transmission may not be the earnest transmission within the coordination set. Consequently, transmissions from other nodes (in the coordination set) with timings of OFDM symbols being in advance with respect to the FFT sampling window may be applied by a wireless device. Moreover, in some cases the transmission form the macro node may not have the strongest signal power (e.g., a reference signal received power (RSRP)) and/or provide the data transmission (e.g., the PDSCH). In these cases, inter-carrier interference (ICI) and inter-symbol interference (ISI) 270 may arise due to incorrect setting of FFT timing at the wireless device. To reduce the ICI and ISI and improve OFDMA symbol reception, the receiver timing can be adjusted, which can shift the FFT window. A number of FFT samples of the OFDM symbol can be captured in the FFT window used to receive the OFDM symbol. Although, a macro node and a LPN are illustrated in FIGS. 1-2, any types of nodes in a DL CoMP system may be used.

The timing synchronization of a receiver timing of a wireless device may be modified to use timing estimations generated from node specific reference signals of a CoMP measurement set, where basic timing synchronization uses the PSS and/or the CRS. A node specific reference signal can include a channel-state information reference signal (CSI-RS). The receiver timing can be the receiver internal processing timing, such as the timing where the receiver looks for OFDM symbols boundaries or the moments where the receiver takes FFTs (e.g., samples the OFDM symbols). Because different CSI-RS configurations can be assigned to different geographically separated transmission points (e.g., the macro node and the LPN), the timing estimation can be carried out for each transmission point independently. The wireless device can calculate the actual timing for data or a PDSCH reception from multiple nodes based on the multiple timing estimations from CSI-RS.

In an example, the wireless device can receive a plurality of node specific reference signals (RSs), such as CSI-RSs, from a plurality of cooperating nodes (e.g., the macro node and the LPN) in a coordination set of the CoMP system (e.g., a CoMP measurement set). The coordination set can include at least two cooperating nodes. A cooperating node can include a serving node, a macro node, or a LPN. The wireless device can receive node specific RSs from at least two cooperating nodes. The wireless device can generate or calculate a received RS timing from the node specific RSs for a cooperating node. The wireless device can estimate a composite received RS timing from a plurality of received RS timings. The received RS timings can represent timings from at least two cooperating nodes. The wireless device can adjust the receiver timing based on the composite received RS timing. The adjusted receiver timing can be a time a receiver of the wireless device samples, takes, or processes the FFT for a received signal or OFDM symbol.

In one embodiment, the wireless device can determine an earliest received RS timing from the plurality of received RS timing representing the various cooperating nodes. The estimated composite received RS timing used to adjust the receiver timing and/or the FFT window can use or include the earliest received RS timing 282. The earliest received RS timing can represent a DL transmission with a shortest propagation delay relative to other cooperating nodes. The estimated composite received RS timing or a actual PDSCH timing $\tau_{PDSCH}$ can be set to the earliest timing among all calculated timings $\tau_{CSI\text{-}RS}^{(i)}$ of CoMP measurement set, represented by $$\tau_{PDSCH} = \min_i(\tau_{CSI-RS}^{(i)}),$$

where $\tau_{PDSCH}$ is a physical downlink shared channel (PD-SCH) timing, $\tau_{CSI-RS}^{(i)}$ is a calculated channel-state information reference signal (CSI-RS) timing for each node of a CoMP measurement set, min( ) is a minimum function, and i is a positive integer representing the nodes in the CoMP measurement set (i.e. there are i nodes in the CoMP measurement set). At a wireless device, adjusting the receiver timing or the FFT window based on the earnest received RS timing can reduce the timings of signals being advanced with respect to the FFT sampling interval of the wireless device. In an example, the estimated composite received RS timing using the earliest received RS timing can be used in joint transmission (JP/JT) of joint processing (JP), so the FFT sampling interval can be adjusted correspond to the CSI-RS timing of the nearest the node. In joint transmission (JT), the PDSCH can be transmitted from the plurality of cooperating nodes of coordinated cells.

Figure 3:
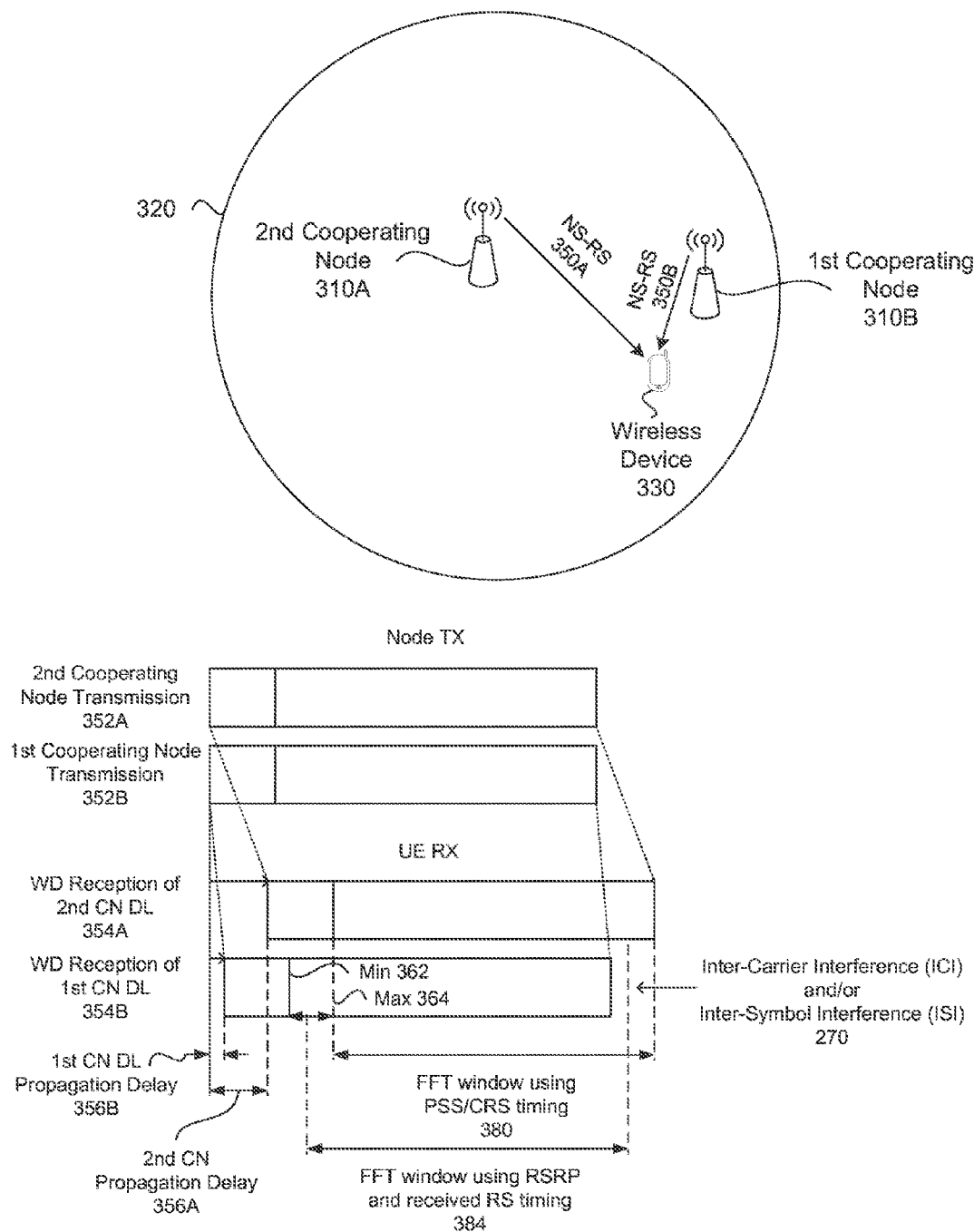
FIG. 3 illustrates a diagram of an orthogonal frequency-division multiplexing (OFDM) symbol transmission from a plurality of cooperating nodes in coordination set and a received OFDM symbol at a wireless device and adjusting a fast Fourier transform (FFT) window using reference signal received power (RSRP) and received reference signal (RS) timing in accordance with an example.

In another embodiment, the wireless device can determine a minimal received RS timing and a maximal received RS timing from the plurality of received RS timing representing the various cooperating nodes. The estimated composite received RS timing can be a value or a receiver RS timing substantially between a minimal received RS timing and a maximal received RS timing. As shown in FIG. 3, the minimal received RS timing 362 can include the earliest received RS timing representing a DL transmission with a shortest propagation delay relative to other cooperating nodes. The maximal received RS timing 364 can include the latest received RS timing representing a DL transmission with a longest propagation delay relative to other cooperating nodes.

In another embodiment, the composite received RS timing used to adjust the receiver timing and/or the FFT window can be determined or calculated by a combination of a reference signal received power (RSRP) for the cooperating nodes and the received RS timing generated from the node specific RSs of the cooperating nodes. For example, the estimated composite received RS timing 284 or an actual timing can be calculated using the weighted sum of CSI-RS timings represented by $$\tau_{PDSCH} = \frac{\sum_i f(RSRP_{CSI-RS}^{(i)}) \tau_{CSI-RS}^{(i)}}{\sum_i f(RSRP_{CSI-RS}^{(i)})},$$

where $\tau_{PDSCH}$ is a physical downlink shared channel (PD-SCH) timing, $\tau_{SCI-RS}^{(i)}$ is each of calculated channel-state information reference signal (CSI-RS) timings of a CoMP measurement set, $RSRP_{CSI-RS}^{(i)}$ is CSI-RS antenna port received signal power, i is a positive integer representing the nodes in the CoMP measurement set, and to is a monotonic function of its argument (i.e., function arguments). Adjusting the receiver timing or the FFT window based on the RSRP can give weight or priority to the received OFDM symbols from the channels or signals with greatest or strongest signal power. The composite received RS timing using the combination of a reference signal received power (RSRP) and the received RS timing for the cooperating nodes can be using in dynamic point selection (DPS) or dynamic cell selection (DCS) of joint processing (JP). In dynamic cell selection (DCS), PDSCH is transmitted from a single cooperating node in the coordination set, which can be dynamically selected.

In another embodiment, a sending cooperating node or a controller in a core network can select a selected cooperating node from a plurality of cooperating nodes to be used for a reference cooperating node in adjusting the receiver timing of the wireless device. The sending cooperating node can be a same cooperating node or a different cooperating node from the selected cooperating node. The sending cooperating node can transmit a selection of the selected cooperating node to the wireless device. The wireless device can receive from the cooperating node the selection of the selected cooperating node. The selection of the selected cooperating node can be transmitted or signaled in downlink control information (DCI) targeted for the wireless device. The wireless device can receive a plurality of node specific RS from the various cooperating nodes. The wireless device can generate a synchronization RS timing from a node specific RS from the selected cooperating node. The synchronization RS timing can be used to adjust the receiver timing of the wireless device (for timing synchronization) for received data or a received physical downlink shared channel (PDSCH). The composite received RS timing can include the synchronization RS timing. In this way, a cooperating node (e.g., the sending cooperating node) or a controller in a core network can select the RS timing to be used for the composite received RS timing used to adjust the receiver timing to receive the PDSCH.

FIG. 3 illustrates adjusting a receiver timing of a wireless device in a Coordinated MultiPoint (CoMP) system with two cooperating nodes 310A-B (e.g., a first and second cooperating node) transmitting node specific reference signals (NS-RS) 350A-B to a wireless device 330 in a coordination set 320. The wireless device can be initially synchronized to the PSS and/or CRS transmission point (e.g., the second cooperating node). For example, an OFDM symbol in a first cooperating node transmission 352B and a substantially same OFDM symbol in a second cooperating transmission 352A can be received by the wireless device at different times due to propagation delays. A wireless device (WD) reception of a second cooperating node (ON) DL transmission 354A can have a larger propagation delay 356A than a propagation 356B delay of a wireless device (WD) reception of a first cooperating node (ON) DL transmission 354B due to the wireless device being closer to the first cooperating node than the second cooperating node. If the PSS and/or CRS from the macro node are used for timing synchronization, the timing of the fast Fourier transform (FFT) window 380 used to sample the OFDM symbol can be synchronized to the macro node DL transmission. The estimated composite received RS timing 384 used to adjust the receiver timing and/or the FFT window can use or include the earliest received RS timing or can be determined or calculated by a combination of a reference signal received power (RSRP) for the cooperating nodes and the received RS timing. The cooperating nodes can transmit a node specific RS to the wireless device prior to the wireless device generating the received RS timings from the plurality of cooperating nodes.

Figure 4:
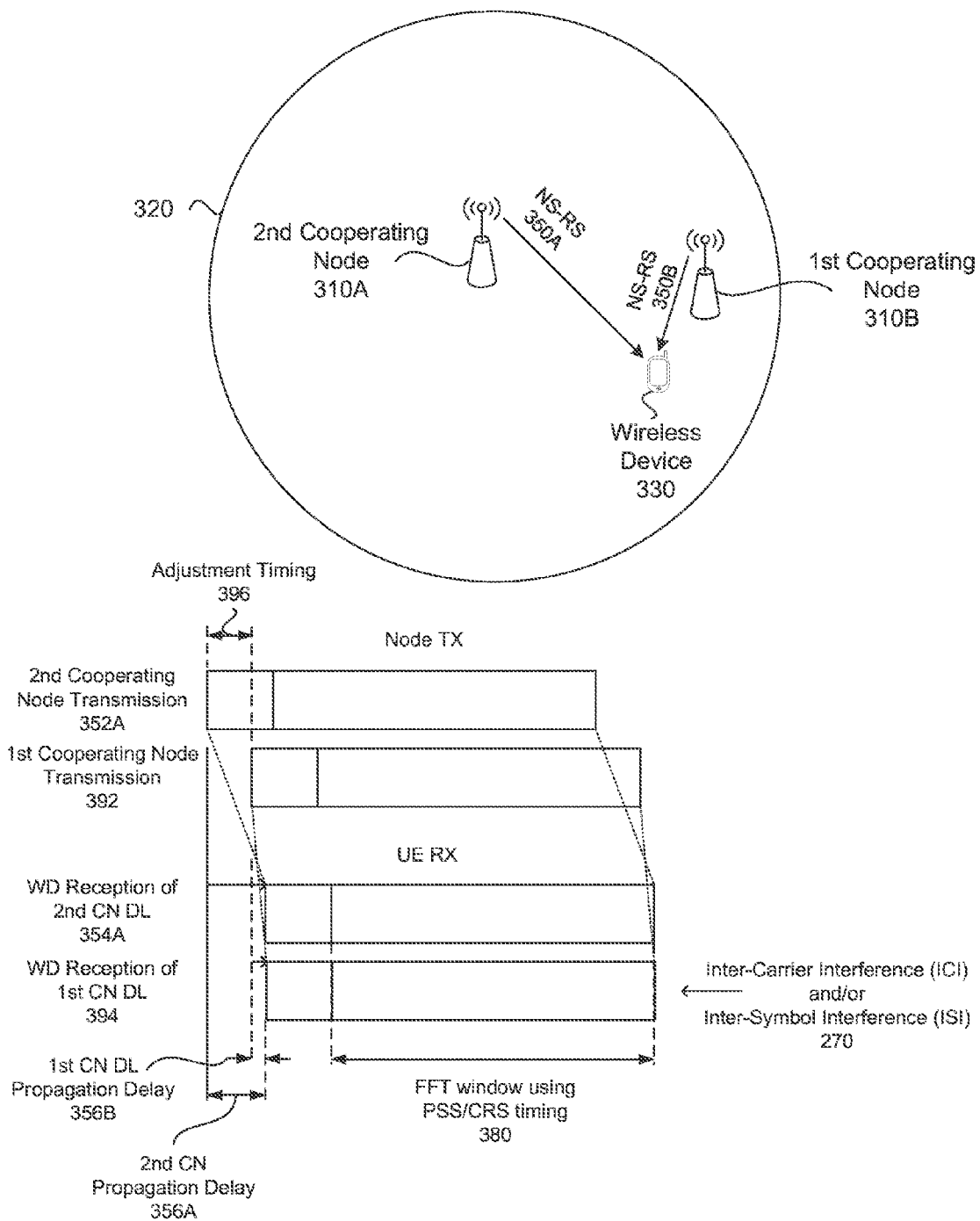
FIG. 4 illustrates a diagram of an orthogonal frequency-division multiplexing (OFDM) symbol transmission from a plurality of cooperating nodes in coordination set and a received OFDM symbol at a wireless device and adjusting an inverse fast Fourier transform (IFFT) window of a first cooperating node using an adjustment timing in accordance with an example.

FIG. 4 illustrates another example of synchronizing a timing of a DL transmission of a first cooperating node relative to a downlink transmission of a second cooperating node in a Coordinated Multipoint (CoMP) system to reduce ICI and ISI. The OFDM symbol can be received from two cooperating nodes a substantially same time. The adjustment timing 396 can be made at the transmitter timer of a cooperating node, which can shift an inverse fast Fourier transform (IFFT) modulating window. The IFFT modulator or IFFT module can be used to generate modulated signals. A wireless device can transmit to the first cooperating node a timing feedback including the composite received RS timing or the first cooperating node received RS timing generated from the node specific RSs from the first cooperating node. The first cooperating node can receive the timing feedback from the wireless device. The first cooperating node can modify a downlink transmission timing (e.g., the first cooperating node DL transmission 392) by an adjustment timing 396 using the composite received RS timing or the first cooperating node received RS timing. Modifying the downlink transmission timing can include shifting (e.g., delaying or advancing) an inverse fast Fourier transform (IFFT) timing of a downlink signal used for the downlink transmission by the composite received RS timing or the first cooperating node received RS timing. The change in the wireless device (WD) reception of the first cooperating node (CN) DL transmission 394 can reduce the time between a minimal received RS timing and a maximal received RS timing, which can align the received OFDM symbols and reduce ICI and ISI. In another example, the downlink transmission from at least two cooperating nodes in the plurality of cooperating nodes may be received by the wireless device at a substantially same time. In another example, the DL transmission of the cooperating nodes may be adjusted to synchronize the reception of the DL transmission at the wireless device to a specified timing, such as the existing PSS and/or CRS.

In another example, the receiver timing of the wireless device can be adjusted using the information from the node specific RS from a plurality of cooperating nodes and the transmitter timing of at least one cooperating node can be adjusted using the timing feedback to reduce the time between a minimal received RS timing and a maximal received RS timing.

Figure 5:
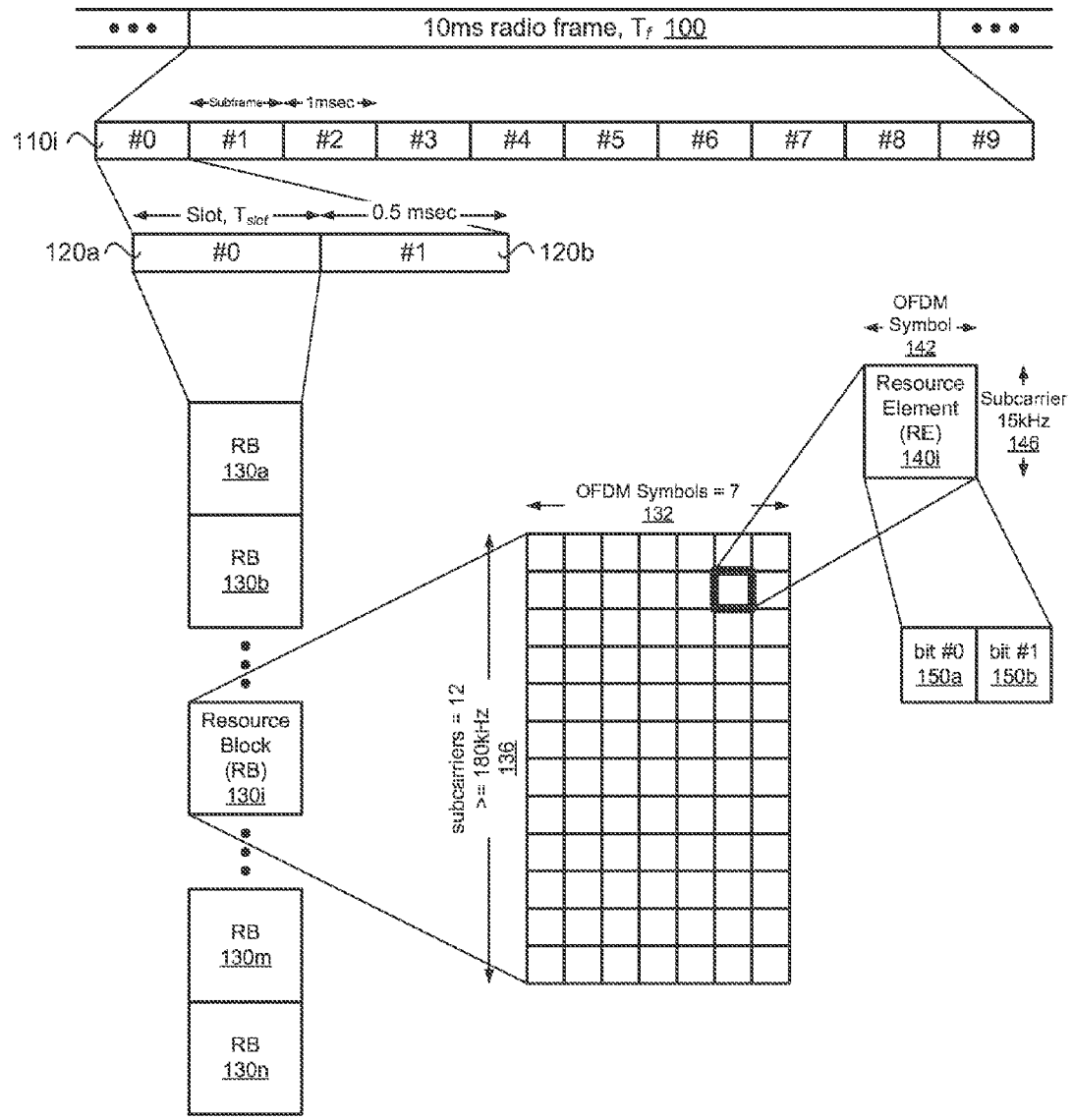
FIG. 5 illustrates a block diagram of radio frame resources in accordance with an example.

In one example, the OFDM symbols and node specific RSs can represent elements of a radio frame structure transmitted on the physical (PHY) layer in a downlink transmission or uplink transmission between a node (or eNodeB) and the wireless device (or UE) using a generic long term evolution (LTE) frame structure, as illustrated in FIG. 5. While an LTE frame structure is illustrated, a frame structure for an IEEE 802.16 standard (WiMax), an IEEE 802.11 standard (WiFi), or another type of communication standard using OFDM may also be used.

FIG. 5 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. Each slot for a component carrier (CC) used by the transmitting station and the receiving station can include multiple resource blocks (RBs) 130a, 130b, 130i, 130m, and 130n based on the CC frequency bandwidth. The CC can have a carrier frequency having a bandwidth and center frequency. Each RB (physical RB or PRB) 130i can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be a known signal used for various reasons, such as to synchronize timing, estimate a channel, and/or noise in the channel. Reference signals can be received and transmitted by transmitting stations and mobile communication devices. Different types of reference signals (RS) can be used in a RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS).

The CRS can be transmitted in downlink subframes in a cell supporting a PDSCH. Data is transmitted from an eNodeB to a UE via a PDSCH. The MBSFN reference signal can be transmitted when the physical multicast channel (PMCH) is transmitted in a MBSFN subframe. The UE-RS or DMRS can be transmitted in downlink subframes supporting the PDSCH. The UE-RS (DMRS) can be transmitted within the resource blocks assigned for downlink shared channel (DL-SCH) transmission to a specific terminal (e.g., mobile communication device), used for beamforming to a single UE using multiple antennas, and used for PDSCH demodulation. The PRS can be transmitted in an RB in downlink subframe configured for PRS transmission, but may not be mapped to a physical broadcast channel (PBCH), a primary synchronization signal (PSS), or a secondary synchronization signal (SSS). The CSI-RS can be used for downlink channel quality measurements.

Figure 6:
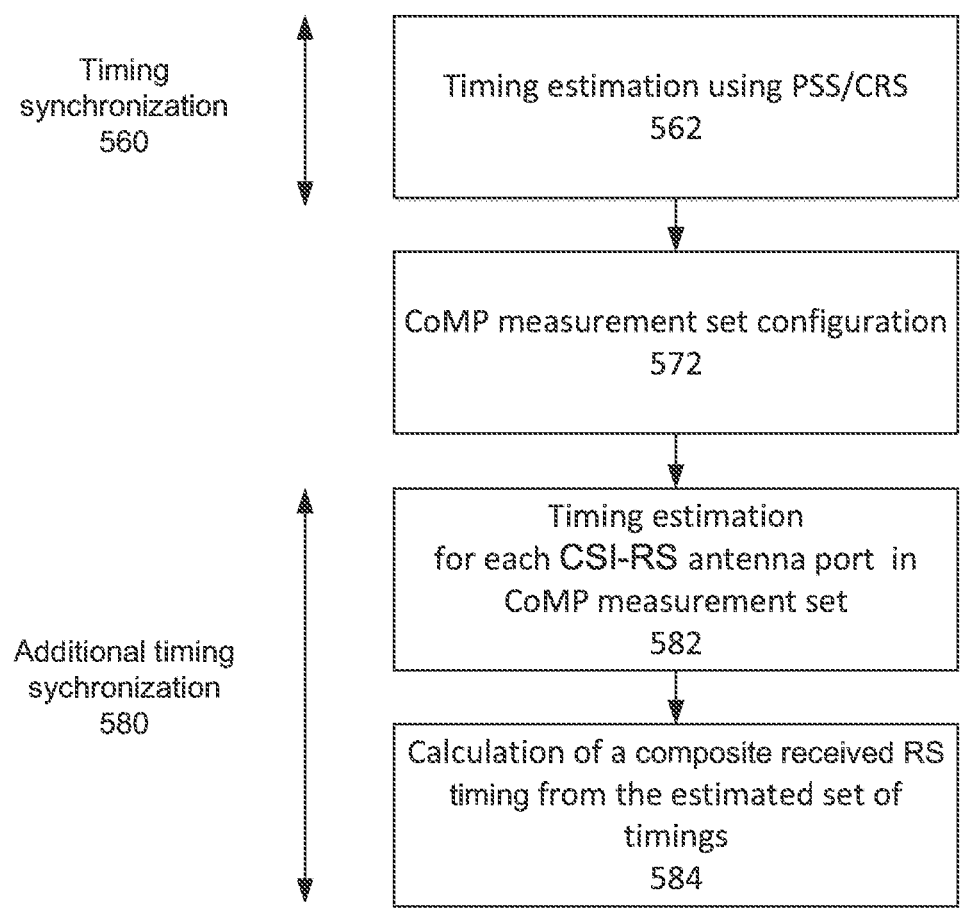
FIG. 6 depicts a flow chart of timing synchronization for a downlink (DL) transmission in a Coordinated MultiPoint (CoMP) system in accordance with an example.

FIG. 6 illustrates an example flow chart of timing synchronization 560 and additional timing synchronization 580 for a downlink (DL) transmission in a Coordinated MultiPoint (CoMP) system. Initially, timing estimation for a receiver for a wireless device can be generated using PSS and/or CRS 562 from a cooperating node. A CoMP measurement set configuration 572 can be generated by at least one cooperating node. In another embodiment, the CoMP measurement set configuration 572 may be received by at least one cooperating node from a controller in a core network. At least a segment of the CoMP measurement set configuration can be sent to the wireless device. The segment of the CoMP measurement set transmitted to the wireless device can include the cooperating nodes in coordination set used for the measurement of the node specific RSs (e.g., CSI-RSs). The additional timing synchronization can include a timing estimation for each CSI-RS antenna port in CoMP measurement set 582 and a calculation of a composite received RS timing from the estimated set of timings 584 used to adjust or generate the actual timing of the receiver of the wireless device.

The additional timing synchronization using the node specific RS or CSI-RS over controlling timing synchronization with just the PSS, SSS, and/or CRS signals can allow the receiver timing to be adjusted to receive the data OFDM symbols from different cooperating nodes so that a majority of the OFDM symbol boundaries fall within a guard interval of OFDM symbol, which can reduce the ICI and ISI. The receiver timing can include the receiver internal processing timing, the timing where the receiver looks for OFDM symbols boundaries, or the moments where the receiver takes or samples the FFTs. The additional timing synchronization uses several received reference signal timings from different cooperating nodes instead of just the PSS, SSS, and/or CRS signals from a single node. Each received reference signal (RS) timing can be from an ith cooperating node, where i is a positive integer representing the nodes in the CoMP measurement set. The OFDM symbols boundaries can be in the signal received from ith cooperating node, which can include the serving node. The values for the received RS timings can be measured or generated using the node specific RSs or CSI-RSs from the ith cooperating node. The timings can include possible delays such as transmitter (TX) delay, propagation delay, receiver (RX) delay, and other processing delay.

Figure 7:
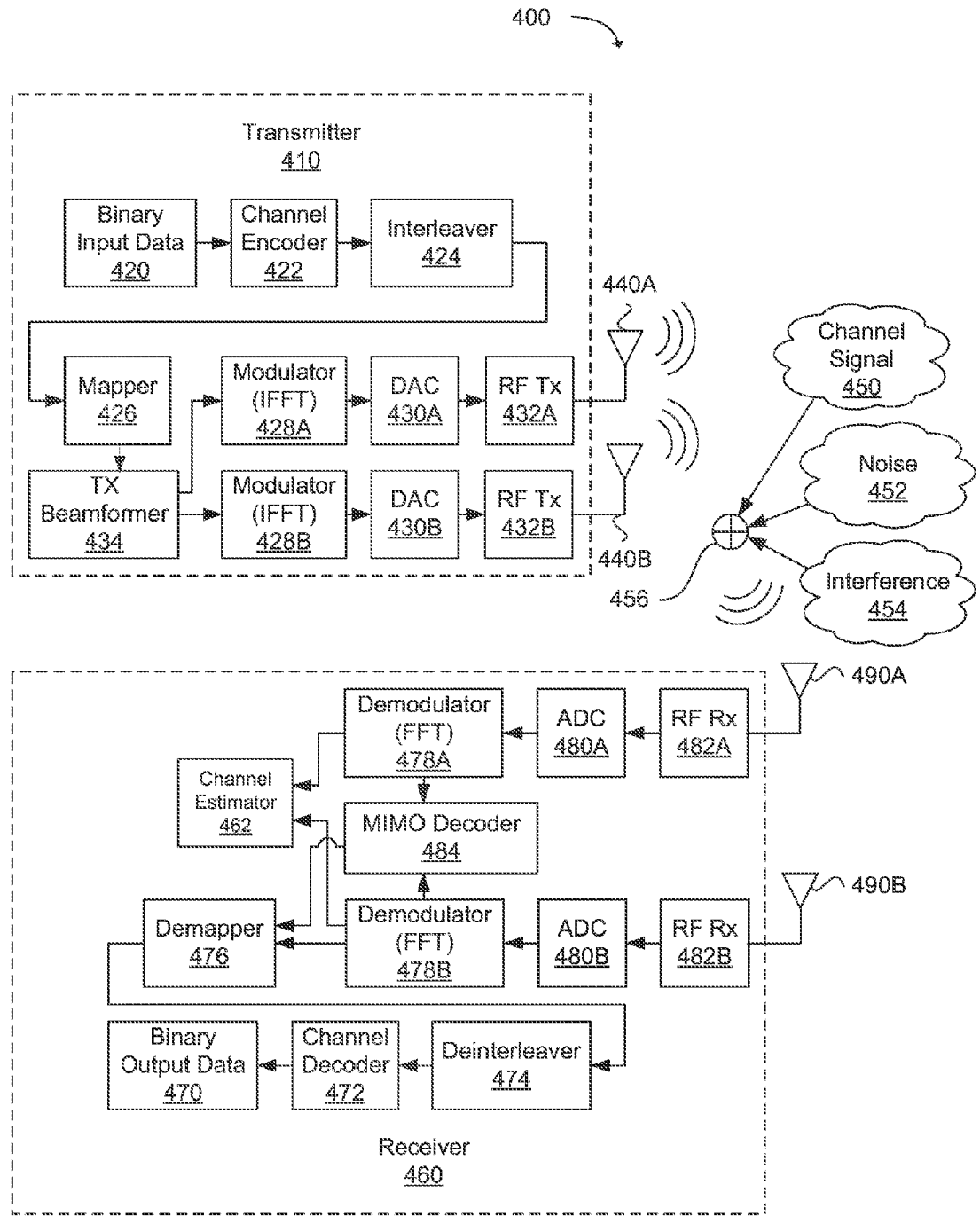
FIG. 7 illustrates a block diagram of the physical layer of a transmitter and receiver in an orthogonal frequency-division multiplexing (OFDM) wireless network in accordance with an example.

FIG. 7 illustrates a OFDM demodulator including a FFT demodulator in a receiver (RX) used for a downlink in a wireless device and an OFDM modulator including an IFFT modulator in a transmitter used for a downlink in a cooperating node. The timing of the FFT demodulator may be adjusted for the OFDM symbols using the additional timing synchronization.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 7. A basic multiple-input multiple-output (MIMO) system is used for simplicity in illustrating the basic hardware transmission components, but the components can also be adapted for a complex MIMO system, a SISO system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel 450. The physical layer can include other components (not shown), such as series-to-parallel (S/P) converters, parallel-to-serial (P/S) converters, cyclic prefix (CP) inserters and deleters, guardband inserters and deleters, and other desired components.

The signal transmitted through a channel 450 can be subject to noise 452 and interference 454. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, or a transmission rank indicator (RI) report. The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 8:
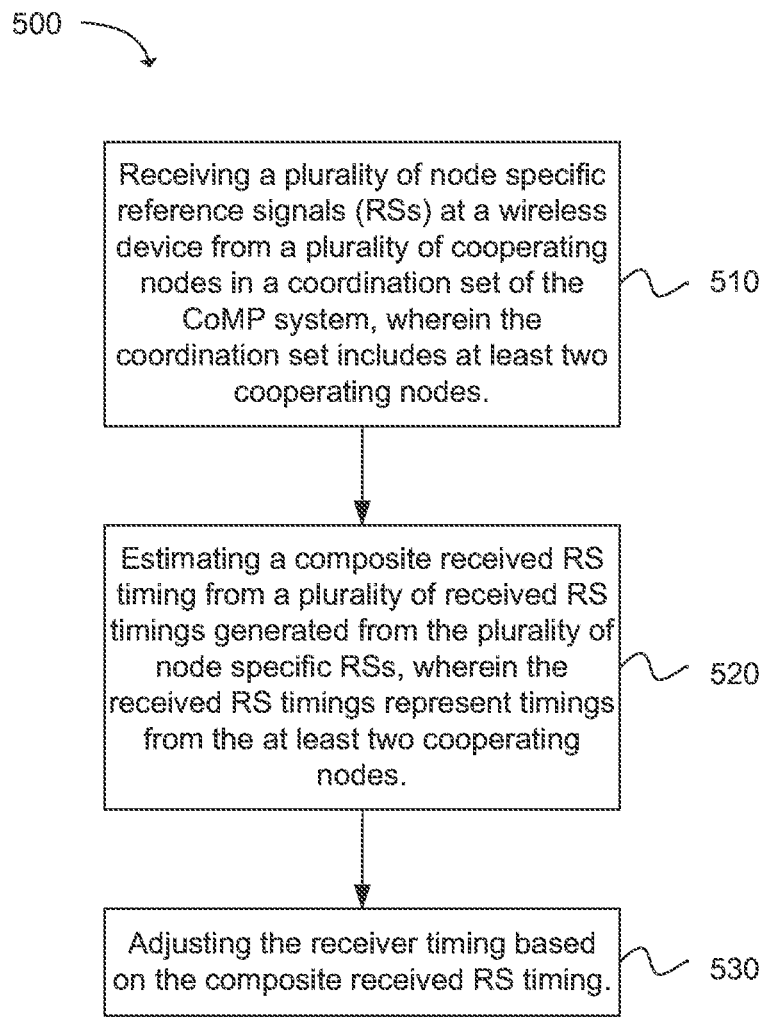
FIG. 8 depicts a flow chart of a method for adjusting a receiver timing of a wireless device in a Coordinated Multi-Point (CoMP) system in accordance with an example.

Another example provides a method 500 for adjusting a receiver timing of a wireless device in a Coordinated Multi-Point (CoMP) system, as shown in the flow chart in FIG. 8. The method may be executed as instructions on a machine, where the instructions are included on at least one computer readable medium or one non-transitory machine readable storage medium. The method includes the operation of receiving a plurality of node specific reference signals (RSs) at a wireless device from a plurality of cooperating nodes in a coordination set of the CoMP system, wherein the coordination set includes at least two cooperating nodes, as in block 510. The operation of estimating a composite received RS timing from a plurality of received RS timings generated from the plurality of node specific RSs, wherein the received RS timings represent timings from the at least two cooperating nodes follows, as in block 520. The next operation of the method can be adjusting the receiver timing based at least in part on the composite received RS timing, as in block 530.

The node specific RS can include a channel-state information reference signal (CSI-RS). The adjusted receiver timing can be a time a receiver of the wireless device processes the fast Fourier transform (FFT) for a received signal.

In an embodiment, the operation of estimating a composite received RS timing can further include selecting an earliest received RS timing for the composite received RS timing. The composite received RS timing can be represented by $$\tau_{PDSCH} = \min_{i}(\tau_{CSI-RS}^{(i)}),$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, min( ) is a minimum function, and i is a positive integer representing the nodes in the CoMP measurement set.

In another embodiment, the operation of estimating a composite received RS timing can further include selecting a receiver RS timing substantially between a minimal received RS timing and a maximal received RS timing. The minimal received RS timing can include the timing generated from the first received node specific RS of a first cooperating node and the maximal received RS timing can include the timing generated from the last received node specific RS of a last cooperating node. In an example, the composite received RS timing can be determined by a combination of a reference signal received power (RSRP) for the cooperating nodes and the received RS timing generated from the node specific RSs of the cooperating nodes. In another example, the composite received RS timing can be represented by $$\tau_{PDSCH} = \frac{\sum_i f(RSRP_{CSI-RS}^{(i)}) \tau_{CSI-RS}^{(i)}}{\sum_i f(RSRP_{CSI-RS}^{(i)})},$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, $RSRP_{CSI-RS}^{(i)}$ is CSI-RS antenna port reference signal received power (RSRP), i is a positive integer representing the nodes in the CoMP measurement set, and f( ) is a monotonic function of its argument.

The method can further include the wireless device transmitting from to a cooperating node a timing feedback including the composite received RS timing. In another example, the method can further include the wireless device transmitting from to a cooperating node a timing feedback including a received RS timing generated from the node specific RSs from the cooperating node. The node specific RS can include a primary synchronization signal (PSS), a secondary synchronization signal (SSS), a cell specific reference signal (CRS), or a channel-state information reference signal (CSI-RS).

Figure 9:
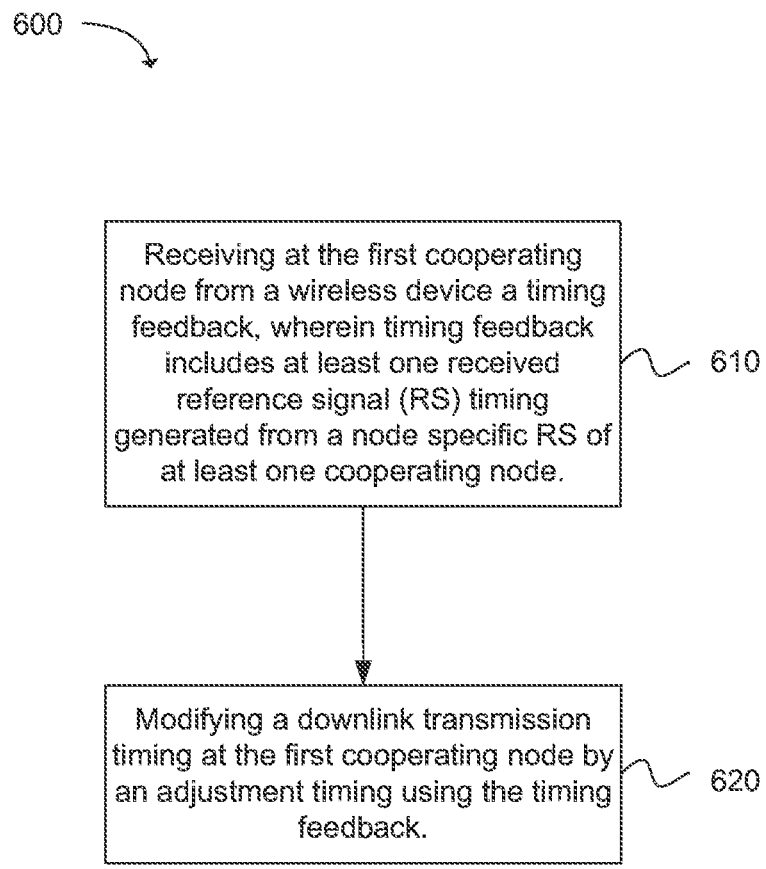
FIG. 9 depicts a flow chart of a method for synchronizing a timing of a downlink (DL) transmission of a first cooperating node relative to a downlink transmission of a second cooperating node in a Coordinated MultiPoint (CoMP) system in accordance with an example.

Another example provides a method 600 for synchronizing a timing of a downlink (DL) transmission of a first cooperating node relative to a downlink transmission of a second cooperating node in a Coordinated MultiPoint (CoMP) system, as shown in the flow chart in FIG. 9. The method may be executed as instructions on a machine, where the instructions are included on at least one computer readable medium or one non-transitory machine readable storage medium. The method includes the operation of receiving at the first cooperating node from a wireless device a timing feedback, wherein timing feedback includes at least one received reference signal (RS) timing generated from a node specific RS of at least one cooperating node, as in block 610. The operation of modifying a downlink transmission timing at the first cooperating node by an adjustment timing using the timing feedback follows, as in block 620.

The timing feedback includes a composite received RS timing or the first cooperating node received RS timing. The composite received RS timing can be estimated from a plurality of received RS timings representing timings from at least two cooperating nodes. The first cooperating node received RS timing can be generated from the node specific RSs from the first cooperating node. The received RS timings can be generated from the plurality of node specific RSs.

In an example, the composite received RS timing can include a first cooperating node received RS timing generated from the node specific RSs from the first cooperating node. The node specific reference signal includes a channel-state information reference signal (CSI-RS). The downlink transmission includes data or a physical downlink shared channel (PDSCH). The operation of modifying the downlink transmission timing can further include shifting an inverse fast Fourier transform (IFFT) timing of a downlink signal used for the downlink transmission based on the composite received RS timing or the first cooperating node received RS timing. The method can further include the first cooperating node (e.g., the sending cooperating node) selecting a selected cooperating node from a plurality of cooperating nodes. A node specific RS from the selected cooperating node can be used by the wireless device to generate a synchronization RS timing, and the synchronization RS timing can be used for timing synchronization for received data or a received physical downlink shared channel (PDSCH). the first cooperating node can transmit a selection of the selected cooperating node to the wireless device. The synchronization RS timing can be used to adjust a receiver timing of the wireless device for received data or the received PDSCH. The method can further include the first cooperating node transmitting a node specific RS to the wireless device prior to receiving the timing feedback.

Figure 10:
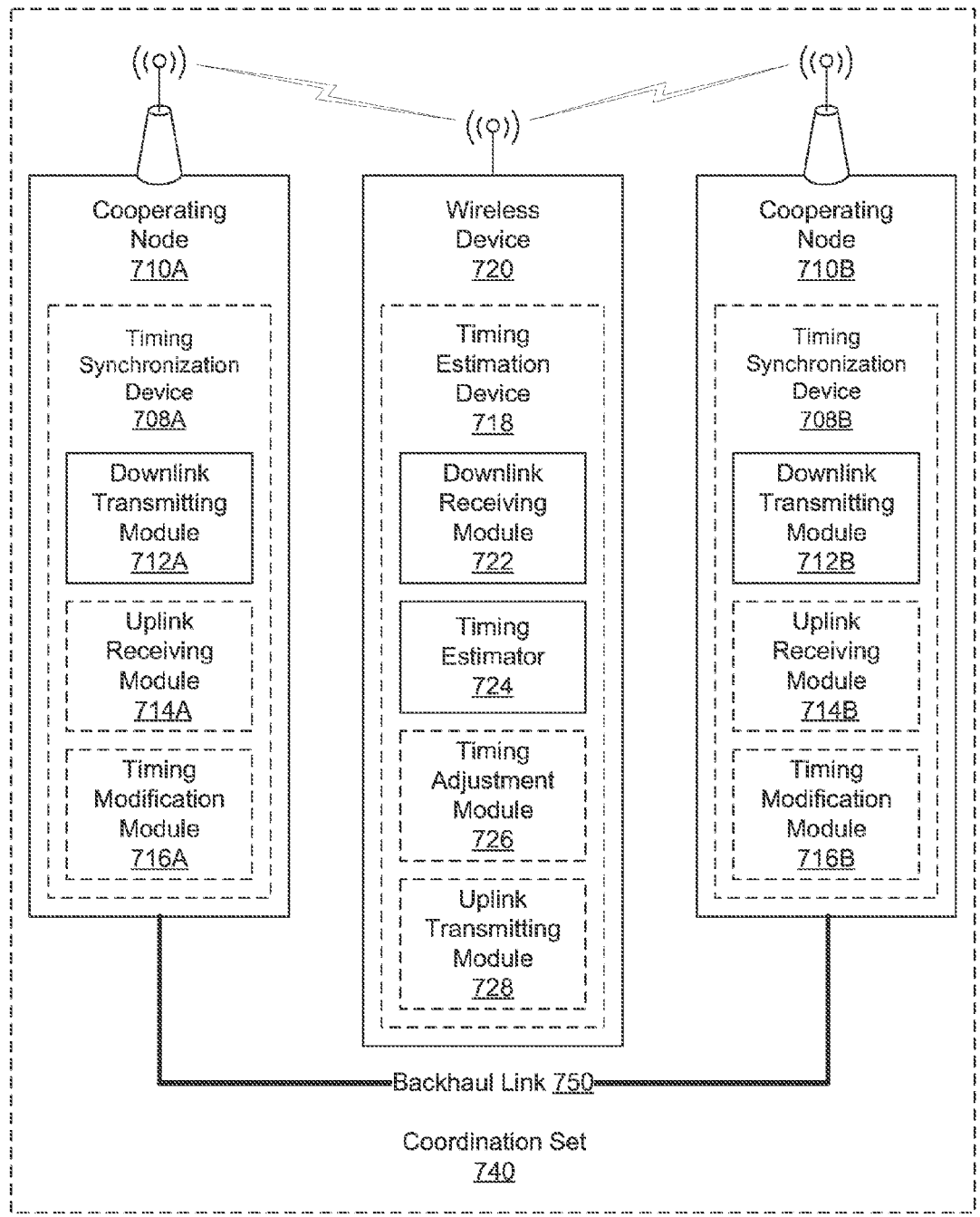
FIG. 10 illustrates a block diagram of a wireless device and a plurality of cooperating nodes in accordance with an example.

FIG. 10 illustrates example cooperating nodes 710A-B and an example wireless device 720 in a Coordinated MultiPoint (CoMP) system. The cooperating nodes can include a macro node (e.g., macro-eNB) or a low power node (e.g., micro-eNB, a pico-eNB, a femto-eNB, or a HeNB).

The wireless device 720 (e.g., UE) can be in communication with the cooperating nodes 710A-B. The wireless device can include a timing estimation device 718 for estimating a receiver timing of a wireless device in a Coordinated Multi-Point (CoMP) system. The timing estimation device can include downlink receiving module 722 and a timing estimator 724. In some embodiments, the timing estimation device can include a timing adjustment module 726 and uplink (UL) transmitting module 728. The wireless device can include a transceiver configured to receive DL transmission information from the cooperating nodes and transmit UL transmission information to the cooperating nodes.

The downlink receiving module 722 can be configured to receive a plurality of node specific reference signals (RSs) at a wireless device from a plurality of cooperating nodes in a coordination set of the CoMP system. The coordination set can include at least two cooperating nodes. The downlink receiving module can be further configured to receive a selection of a selected cooperating node. The selected cooperating node can be selected by or a controller in a core network or a cooperating node from a plurality of cooperating nodes. A node specific RS from the selected cooperating node can be used by the wireless device to generate a synchronization RS timing, and the synchronization RS timing can be used for timing synchronization or to adjust a receiver timing of the wireless device for received data or a received physical downlink shared channel (PDSCH). The timing estimator 724 can be configured to estimate a composite received RS timing from a plurality of received RS timings generated from the plurality of node specific RSs. The received RS timings can represent timings from the at least two cooperating nodes. The node specific RS includes a channel-state information reference signal (CSI-RS). In an example, the timing estimator can be configured to select an earliest received RS timing for the composite received RS timing. The composite received RS timing can be represented by $$\tau_{PDSCH} = \min_i (\tau_{CSI-RS}^{(i)}),$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, min( ) is a minimum function, and i is a positive integer representing the nodes in the CoMP measurement set. In another example, the timing estimator can be configured to select a receiver RS timing substantially between a minimal received RS timing and a maximal received RS timing using the composite received RS timing. In another example, the timing estimator can be configured determine the composite received RS timing from a combination of a reference signal received power (RSRP) for the cooperating nodes and the received RS timing generated from the node specific RSs of the cooperating nodes. The composite received RS timing is represented by $$\tau_{PDSCH} = \frac{\sum_i f(RSRP_{CSI-RS}^{(i)}) \tau_{CSI-RS}^{(i)}}{\sum_i (RSRP_{CSI-RS}^{(i)})},$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, $RSRP_{CSI-RS}^{(i)}$ is CSI-RS antenna port reference signal received power (RSRP), i is a positive integer representing the nodes in the CoMP measurement set, and f( ) is a monotonic function of its argument.

The timing adjustment module 726 can be configured to adjust the receiver timing based on the composite received RS timing. The adjusted receiver timing can be a time a receiver of the wireless device processes the fast Fourier transform (FFT) for a received signal. The time can represent a boundary of a FFT window. The uplink transmitting module 728 can be configured to transmit to a cooperating node a timing feedback including the composite received RS timing or a received RS timing generated from the node specific RSs from the cooperating node. The wireless device can include a user equipment (UE) and a mobile station (MS). The wireless device can configured to connect to at least one of a wireless local area network (WLAN), a wireless personal area network (WPAN), and a wireless wide area network (WWAN). The wireless device can include an antenna, a touch sensitive display screen, a speaker, a microphone, a graphics processor, an application processor, internal memory, or a non-volatile memory port.

Each cooperating node 710A-B can include a timing synchronization device 708A-B for synchronizing a timing of a downlink (DL) transmission of a first cooperating node relative to a downlink transmission of a second cooperating node in a Coordinated MultiPoint (CoMP) system. The timing synchronization device can include a downlink transmitting module 712A-B, an uplink receiving module 714A-B, and a timing modification module 716A-B. In an example, the timing synchronization device can include a selection module (not shown). In another example, the selection module can be included in a controller in a core network. The cooperating nodes can be in coordination set 740 of the CoMP system and communicate with each other via a backhaul link 750. The backhaul link can include X2 signaling or backhaul link signaling via a wired connection, a wireless connection, or an optical fiber connection. The communication between cooperating nodes can include COMP measurement set information.

The uplink receiving module 714A-B can be configured to receive from a wireless device a timing feedback. The timing feedback can include at least one received reference signal (RS) timing generated from a node specific RS of at least one cooperating node. The timing feedback can include a composite received reference signal (RS) timing or a first cooperating node received RS timing. The composite received RS timing can be estimated from a plurality of received RS timings representing timings from at least two cooperating nodes and the received RS timings can be generated from the plurality of node specific RSs. The first cooperating node received RS timing can be generated from the node specific RSs from the first cooperating node. The timing modification module 716A-B can be configured to modify a downlink transmission timing at the first cooperating node by an adjustment timing using the timing feedback. The node specific reference signal includes a channel-state information reference signal (CSI-RS). The timing modification module can be further configured to shift a fast inverse Fourier transform (IFFT) timing of a downlink signal used for the downlink transmission by the composite received RS timing or a cooperating node received RS timing. A downlink transmitting module 712A-B can be configured to transmit a node specific RS to the wireless device. The selection module can be configured to select a selected cooperating node from a plurality of cooperating nodes. A node specific RS from the selected cooperating node can be used by the wireless device to generate a synchronization RS timing, and the synchronization RS timing can be used for timing synchronization for received data or a received physical downlink shared channel (PDSCH). The downlink transmitting module can be further configured to transmit a selection of the selected cooperating node to the wireless device. The synchronization RS timing can be used to adjust a receiver timing of the wireless device for received data or the received PDSCH. The cooperating node can include a macro node, a low power node (LPN), a macro evolved Node B (macro-eNB), a micro-eNB, a pica-eNB, a femto-eNB, or a home eNB (HeNB).

Figure 11:
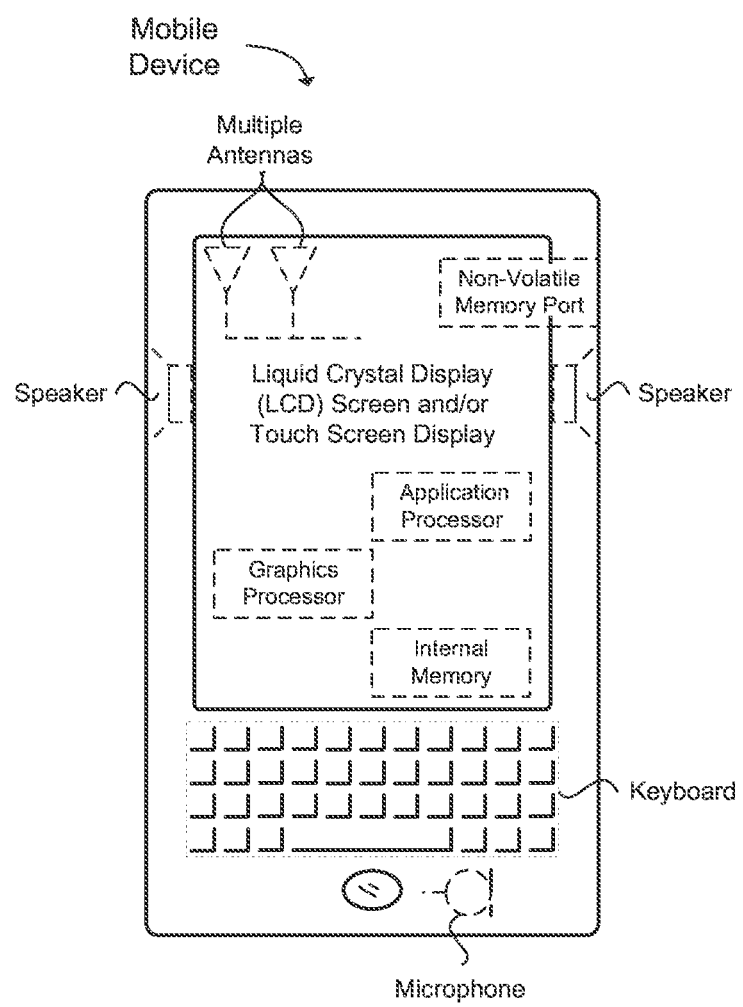
FIG. 11 illustrates a diagram of a wireless device in accordance with an example.

FIG. 11 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, such as a macro node, a low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive facility, and without departing from the principles and concepts of the invention. Accordingly, it is not intended that the invention be limited, except as by the claims set forth below.

What is claimed is:

1. A method for adjusting a receiver timing of a wireless device in a Coordinated MultiPoint (CoMP) system, comprising:
   receiving a plurality of node specific reference signals (RSs) at a wireless device from a plurality of cooperating nodes in a coordination set of the CoMP system, wherein the coordination set includes at least two cooperating nodes; and
   estimating a composite received RS timing from a plurality of received RS timings generated from the plurality of node specific RSs, wherein the received RS timings represent timings from the at least two cooperating nodes;
   adjusting the receiver timing based at least in part on the composite received RS timing; and
   selecting an earliest received RS timing of the composite received RS timing, wherein the composite received RS timing is represented by $$\tau_{PDSCH} = \min_i(\tau_{CSI-RS}^{(i)}),$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, min( ) is a minimum function, and i is a positive integer representing the nodes in the CoMP measurement set.

2. The method of claim 1, wherein the node specific RS includes a channel-state information reference signal (CSI-RS).

3. The method of claim 1, wherein the adjusted receiver timing is a time a receiver of the wireless device processes the fast Fourier transform (FFT) for a received signal.

4. The method of claim 1, wherein estimating the composite received RS timing further comprises selecting a receiver RS timing substantially between a minimal received RS timing and a maximal received RS timing.

5. The method of claim 4, wherein the composite received RS timing is determine by a combination of a reference signal received power (RSRP) for the cooperating nodes and the received RS timing generated from the node specific RSs of the cooperating nodes.

6. The method of claim 4, wherein the composite received RS timing is represented by $$\tau_{PDSCH} = \frac{\sum_i f(RSRP_{CSI-RS}^{(i)})\tau_{CSI-RS}^{(i)}}{\sum_i f(RSRP_{CSI-RS}^{(i)})},$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, $RSRP_{CSI-RS}^{(i)}$ is CSI-RS antenna port reference signal received power (RSRP), i is a positive integer representing the nodes in the CoMP measurement set, and f( ) is a monotonic function of function arguments.

7. The method of claim 1, further comprising:
transmitting from the wireless device to a cooperating node a timing feedback including the composite received RS timing or a cooperating node received RS timing generated from the node specific RSs from the cooperating node.

8. The method of claim 1, wherein the node specific RS is selected from the group consisting of a primary synchronization signal (PSS), a secondary synchronization signal (SSS), a cell specific reference signal (CRS), and a channel-state information reference signal (CSI-RS), and combinations thereof.

9. A timing estimation device for estimating a receiver timing of a wireless device in a Coordinated MultiPoint (CoMP) system, comprising:
a downlink receiving module configured to receive a plurality of node specific reference signals (RSs) at a wireless device from a plurality of cooperating nodes in a coordination set of the CoMP system, wherein the coordination set includes at least two cooperating nodes;
a timing estimator configured to estimate a composite received RS timing from a plurality of received RS timings generated from the plurality of node specific RSs and select an earliest received RS timing for the composite received RS timing and the composite received RS timing is represented by $$\tau_{PDSCH} = \min_i(\tau_{CSI-RS}^{(i)}),$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, min( ) is a minimum function, and i is a positive integer representing the nodes in the CoMP measurement set, wherein the received RS timings represent timings from the at least two cooperating nodes; and a timing adjustment module configured to adjust the receiver timing based on the composite received RS timing.

10. The timing estimation device of claim 9, wherein the node specific RS includes a channel-state information reference signal (CSI-RS).

11. The timing estimation device of claim 9, wherein the adjusted receiver timing is a time a receiver of the wireless device processes the fast Fourier transform (FFT) for a received signal.

12. The timing estimation device of claim 9, wherein the timing estimator is configured to select a receiver RS timing substantially between a minimal received RS timing and a maximal received RS timing.

13. The timing estimation device of claim 12, wherein the composite received RS timing is represented by $$\tau_{PDSCH} = \frac{\sum_i f(RSRP_{CSI-RS}^{(i)})\tau_{CSI-RS}^{(i)}}{\sum_i (RSRP_{CSI-RS}^{(i)})},$$

where $\tau_{PDSCH}$ is a physical downlink shared channel (PDSCH) timing, $\tau_{CSI-RS}^{(i)}$ is each of calculated channel-state information reference signal (CSI-RS) timings of a CoMP measurement set, $RSRP_{CSI-RS}^{(i)}$ is CSI-RS antenna port reference signal received power (RSRP), i is a positive integer representing the nodes in the CoMP measurement set, and f( ) is a monotonic function of function arguments.

14. The timing estimation device of claim 9, further comprising:
a uplink transmitting module configured to transmit to a cooperating node a timing feedback including the composite received RS timing.

15. The timing estimation device of claim 9, wherein the wireless device includes the timing estimation device and the wireless device is selected from the group consisting of a user equipment (UE) and a mobile station (MS), wherein the wireless device is configured to connect to at least one of a wireless local area network (WLAN), a wireless personal area network (WPAN), and a wireless wide area network (WWAN), wherein the wireless device includes an antenna, a touch sensitive display screen, a speaker, a microphone, a graphics processor, an application processor, internal memory, a non-volatile memory port, or combinations thereof.

16. A method for synchronizing a timing of a downlink (DL) transmission of a first cooperating node relative to a downlink transmission of a second cooperating node in a Coordinated MultiPoint (CoMP) system, comprising:
receiving at the first cooperating node from a wireless device a timing feedback, wherein timing feedback includes at least one received reference signal (RS) timing generated from a node specific RS of at least one cooperating node, wherein prior to receiving the timing feedback:
selecting, at the first cooperating node, a second cooperating node from a plurality of cooperating nodes, wherein a node specific RS from the second cooperating node is used by the wireless device to generate a synchronization RS timing, and the synchronization RS timing is used for timing synchronization for received data or a received physical downlink shared channel (PDSCH),
transmitting a selection of the selected cooperating nodes to the wireless device, wherein the synchronization RS timing is used to adjust a receiver timing of the wireless device for received data or the received PDSCH;

modifying a downlink transmission timing at the first cooperating node by an adjustment timing using the timing feedback; and transmitting a node specific RS from the first cooperating node to the wireless device.

17. The method of claim 16, wherein the timing feedback includes a composite received RS timing or the first cooperating node received RS timing, wherein the composite received RS timing is estimated from a plurality of received RS timings representing timings from at least two cooperating nodes or a first cooperating node received RS timing generated from node specific RSs from the first cooperating node, and the received RS timings are generated from the plurality of node specific RSs.

18. The method of claim 16, wherein the node specific reference signal includes a channel-state information reference signal (CSI-RS), and the downlink transmission includes data or a physical downlink shared channel (PDSCH).

19. The method of claim 16, wherein modifying a downlink transmission timing further comprises:

shifting an inverse fast Fourier transform (IFFT) timing of a downlink signal used for the downlink transmission by the composite received RS timing or the first cooperating node received RS timing.

20. A timing synchronization device for synchronizing a timing of a downlink (DL) transmission of a first cooperating node relative to a downlink transmission of a second cooperating node in a Coordinated MultiPoint (CoMP) system, comprising:

a uplink receiving module configured to receive from a wireless device a timing feedback, wherein timing feedback includes at least one received reference signal (RS) timing generated from a node specific RS of at least one cooperating node;

a timing modification module configured to modify a downlink transmission timing by an adjustment timing using the timing feedback;

a downlink transmitting module configured to transmit a node specific RS to the wireless device to adjust a receiver device timing based at least in part on the node specific RS for received data or a received physical downlink shared channel (PDSCH); and transmitting a node specific RS from the at least one cooperating node to a wireless device.

21. The timing synchronization device of claim 20, wherein the node specific reference signal includes a channel-state information reference signal (CSI-RS), and the timing feedback includes a composite received reference signal (RS) timing or the first cooperating node received RS timing, wherein the composite received RS timing is estimated from a plurality of received RS timings representing timings from at least two cooperating nodes, the first cooperating node received RS timing is generated from the node specific RSs from the first cooperating node, and the received RS timings are generated from the plurality of node specific RSs.

22. The timing synchronization device of claim 20, wherein the timing modification module is further configured to shift a fast inverse Fourier transform (IFFT) timing of a downlink signal used for the downlink transmission by the adjustment timing using the timing feedback.

* * * * *